(12) United States Patent
Holman et al.

(10) Patent No.: US 9,405,544 B2
(45) Date of Patent: Aug. 2, 2016

(54) NEXT FETCH PREDICTOR RETURN ADDRESS STACK

(71) Applicant: Apple Inc., Cupertino, CA (US)

(72) Inventors: Douglas C. Holman, San Jose, CA (US); Ramesh B. Gunna, San Jose, CA (US); Conrado Blasco-Allue, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 600 days.

(21) Appl. No.: 13/893,898

(22) Filed: May 14, 2013

(65) Prior Publication Data

US 2014/0344558 A1    Nov. 20, 2014

(51) Int. Cl.
*G06F 7/38*     (2006.01)
*G06F 9/00*     (2006.01)
*G06F 9/38*     (2006.01)
*G06F 9/30*     (2006.01)

(52) U.S. Cl.
CPC .......... *G06F 9/3806* (2013.01); *G06F 9/30054* (2013.01); *G06F 9/382* (2013.01); *G06F 9/3848* (2013.01)

(58) Field of Classification Search
CPC .... G06F 9/3806; G06F 9/3838; G06F 9/3846
See application file for complete search history.

(56) References Cited

U.S. PATENT DOCUMENTS

| | | | |
|---|---|---|---|
| 5,574,871 A | 11/1996 | Hoyt et al. | |
| 5,604,877 A | 2/1997 | Hoyt et al. | |
| 5,732,272 A | 3/1998 | Gochee | |
| 5,768,576 A | 6/1998 | Hoyt et al. | |
| 5,822,575 A | 10/1998 | Tran | |
| 5,845,323 A | 12/1998 | Roberts et al. | |
| 5,848,433 A | 12/1998 | Tran et al. | |
| 5,850,543 A | 12/1998 | Shiell et al. | |
| 5,881,278 A | 3/1999 | Tran et al. | |
| 5,964,868 A | 10/1999 | Gochman et al. | |
| 6,016,533 A | 1/2000 | Tran | |
| 6,073,230 A | 6/2000 | Pickett et al. | |
| 6,138,213 A | 10/2000 | Mcminn | |
| 6,151,671 A | 11/2000 | D'Sa et al. | |
| 6,170,054 B1 | 1/2001 | Poplingher | |

(Continued)

FOREIGN PATENT DOCUMENTS

EP    1513062 A1    3/2005

OTHER PUBLICATIONS

International Search Report and Written Opinion in International Application No. PCT/US2006/028196, mailed Jan. 8, 2007, 16 pages.

(Continued)

*Primary Examiner* — Hyun Nam
(74) *Attorney, Agent, or Firm* — Rory D. Rankin; Meyertons, Hood, Kivlin, Kowert & Goetzel, P.C.

(57) ABSTRACT

A system and method for efficient branch prediction. A processor includes a next fetch predictor to generate a fast branch prediction for branch instructions at an early pipeline stage. The processor also includes a main return address stack (RAS) at a later pipeline stage for predicting the target of return instructions. When a return instruction is encountered, the prediction from the next fetch predictor is replaced by the top of the main RAS. If there are any recent call or return instructions in flight toward the main RAS, then a separate prediction is generated by a mini-RAS.

20 Claims, 10 Drawing Sheets

(56) References Cited

U.S. PATENT DOCUMENTS

| | | |
|---|---|---|
| 6,269,436 B1 | 7/2001 | Tran et al. |
| 6,314,514 B1 | 11/2001 | Mcdonald |
| 6,912,648 B2 | 6/2005 | Hammarlund et al. |
| 7,320,066 B2 | 1/2008 | Yokoi |
| 7,836,290 B2 | 11/2010 | Chaudhry et al. |
| RE42,466 E | 6/2011 | Yokoi |
| 2003/0120906 A1 | 6/2003 | Jourdan et al. |
| 2003/0149865 A1* | 8/2003 | Kadambi ............... G06F 9/3867 712/244 |
| 2005/0050278 A1 | 3/2005 | Meier et al. |
| 2006/0095895 A1* | 5/2006 | K. ........................... G06F 11/28 717/130 |
| 2008/0301420 A1 | 12/2008 | Inoue |
| 2011/0016292 A1 | 1/2011 | McDonald et al. |
| 2012/0017214 A1* | 1/2012 | Shannon ............. G06F 9/30134 718/100 |

OTHER PUBLICATIONS

Powell, et al., "Reducing Set-Associative Cache Energy via Way-Prediction and Selective Direct-Mapping", Microarchitecture, 2001. Micro-34 Proceedings, 34th ACM/IEEE International Symposium on Dec. 1-5, 2001, Piscataway, NJ, USA, IEEE, pp. 54-65, XP010583671 ISBN: 0-7965-1369-7.

Skadron, et al., "Improving Prediction for Procedure Returns with Return-Address-Stack Repair Mechanisms", Published in the Proceedings of the 31st Annual ACM/IEEE International Symposium on Microarchitecture, Nov. 30-Dec. 2, 1998, Dallas, Texas, USA, IEEE, pp. 259-271.

* cited by examiner

|  | F1 | F2 | F3 | F4 | F5 |
|---|---|---|---|---|---|
| Scenario 1: | R | -- | -- | C | -- |
| Scenario 2: | R | -- | C | -- | -- |
| Scenario 3: | R | R | C | -- | -- |
| Scenario 4: | R | R | C | C | -- |

FIG. 10

NEXT FETCH PREDICTOR RETURN ADDRESS STACK

BACKGROUND OF THE INVENTION

1. Field of the Invention

This invention relates to microprocessors, and more particularly, to branch prediction mechanisms.

2. Description of the Relevant Art

Modern day processor systems tend to be structured in multiple stages in a pipelined fashion. Typical pipelines often include separate units for fetching instructions, decoding instructions, mapping instructions, executing instructions, and then writing results to another unit, such as a register. An instruction fetch unit of a microprocessor is responsible for providing a constant stream of instructions to the next stage of the processor pipeline. Typically, fetch units utilize an instruction cache in order to keep the rest of the pipeline continuously supplied with instructions. The sequence of instructions being fetched is based upon a prediction of the program flow, which is normally sequential. However, branch instructions can change the sequential nature of program flow. Therefore, accurate prediction of branch instructions can ensure that the fetch unit continues to fetch instructions down the correct path.

Branch prediction techniques can predict an evaluation of a condition of a branch instruction and/or a branch target address. The branch prediction logic may be complex in order to provide a high accuracy. Therefore, the branch prediction logic may use multiple clock cycles to perform evaluations and calculations to produce results for the condition and the branch target address. However, during these multiple clock cycles, instructions are being fetched from the instruction cache. These fetched instructions may be flushed if the branch prediction logic determines other instructions should be fetched.

The branch prediction logic may utilize logic that trades off accuracy for faster results. However, the lower accuracy may lead to situations where instructions are fetched down the wrong path. For example, a program being executed by the processor may utilize a subroutine that gets called from multiple different locations in the code. When attempting to generate a fast branch target prediction for this subroutine, the branch prediction logic may often mispredict the next fetch program counter (PC) address since the return address is not static. These mispredictions result in a stall in the processor pipeline while the fetching of instructions is redirected and the incorrectly fetched instructions are flushed. A stall in a pipeline may prevent useful work from being performed during one or more pipeline stages. Some stalls may last several clock cycles and significantly decrease processor performance In view of the above, improved methods and mechanisms for efficient branch prediction are desired.

SUMMARY OF EMBODIMENTS OF THE INVENTION

Systems and methods for faster and more accurate branch prediction. In one embodiment, a processor may be pipelined into multiple pipeline stages. The processor pipeline includes a next fetch predictor, which may quickly generate branch prediction data, such as a branch direction and a branch target address. In some embodiments, the next fetch predictor may be a single-cycle predictor for branch instructions. The next fetch predictor may predict branch targets at an early stage of the processor pipeline. The processor pipeline may also include a return address stack (RAS) for storing return addresses for call branch instructions. The RAS may be updated at a later stage of the pipeline.

In one embodiment, the next fetch predictor may include entries for each of the branch instructions encountered in the program code. An indicator may be stored in each entry of the next fetch predictor to indicate if the branch instruction is a return branch instruction. In one embodiment, a lookup of the next fetch predictor may be performed for each fetch address used to fetch instructions. If the lookup results in a hit to an entry corresponding to a return branch instruction, the prediction from the next fetch predictor may be ignored, and instead, the top of the RAS may be used as the branch target prediction.

In another embodiment, a separate RAS may be maintained early in the pipeline with the next fetch predictor. This separate RAS, also referred to as a mini-RAS, may keep track of call and return branch instructions that are in-flight toward the main RAS at the later stage of the processor pipeline. The mini-RAS may be utilized to provide a first-stage branch target prediction for a new return branch instruction when there are one or more recently fetched call or return branch instructions in the early stages of the pipeline that have not yet updated the main RAS.

These and other embodiments will be further appreciated upon reference to the following description and drawings.

BRIEF DESCRIPTION OF THE DRAWINGS

FIG. 10 illustrates different scenarios of call and return instructions in a processor pipeline.

DETAILED DESCRIPTION

Figure 1:
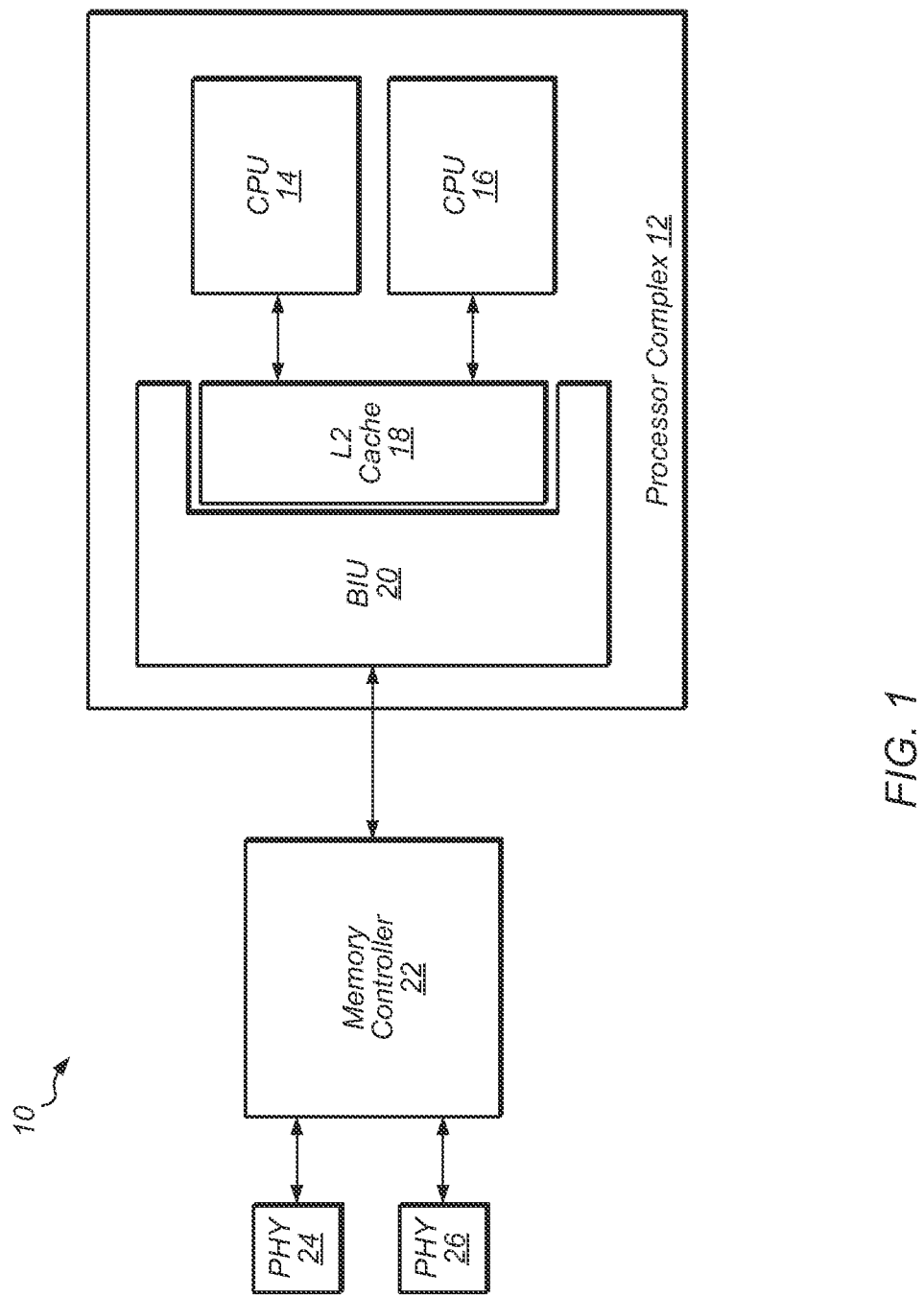
FIG. 1 illustrates one embodiment of a portion of an integrated circuit.

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising an instruction cache . . . . " Such a claim does not foreclose the apparatus from including additional components (e.g., a load store unit, an execution unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes a processor complex 12, memory controller 22, and memory physical interface circuits (PHYs) 24 and 26. It is noted that IC 10 may also include many other components not shown in FIG. 1. In various embodiments, IC 10 may also be referred to as a system on chip (SoC), an application specific integrated circuit (ASIC), or an apparatus.

Processor complex 12 may include central processing units (CPUs) 14 and 16, level two (L2) cache 18, and bus interface unit (BIU) 20. In other embodiments, processor complex 12 may include other numbers of CPUs. CPUs 14 and 16 may also be referred to as processors or cores. It is noted that processor complex 12 may include other components not shown in FIG. 1.

The CPUs 14 and 16 may include circuitry to execute instructions defined in an instruction set architecture (ISA). Specifically, one or more programs comprising the instructions may be executed by CPUs 14 and 16. Any ISA may be implemented in various embodiments. For example, in one embodiment, the ARM™ ISA may be implemented. The ARM instruction set may include 16-bit (Thumb or Thumb-2) and 32-bit instructions. Other ISAs may include the PowerPC™ instruction set, the MIPS™ instruction set, the SPARC™ instruction set, the x86 instruction set (also referred to as IA-32), the IA-64 instruction set, etc.

Each of CPUs 14 and 16 may also include a level one (L1) cache (not shown), and each L1 cache may be coupled to L2 cache 18. Other embodiments may include additional levels of cache (e.g., level three (L3) cache). In one embodiment, L2 cache 18 may be configured to cache instructions and data for low latency access by CPUs 14 and 16. The L2 cache 18 may comprise any capacity and configuration (e.g. direct mapped, set associative). L2 cache 18 may be coupled to memory controller 22 via BIU 20. BIU 20 may also include various other logic structures to couple CPUs 14 and 16 and L2 cache 18 to various other devices and blocks.

Memory controller 22 may include any number of memory ports and may include circuitry configured to interface to memory. For example, memory controller 22 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 22 may also be coupled to memory physical interface circuits (PHYs) 24 and 26. Memory PHYs 24 and 26 are representative of any number of memory PHYs which may be coupled to memory controller 22. Memory PHYs 24 and 26 may be configured to interface to memory devices (not shown).

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
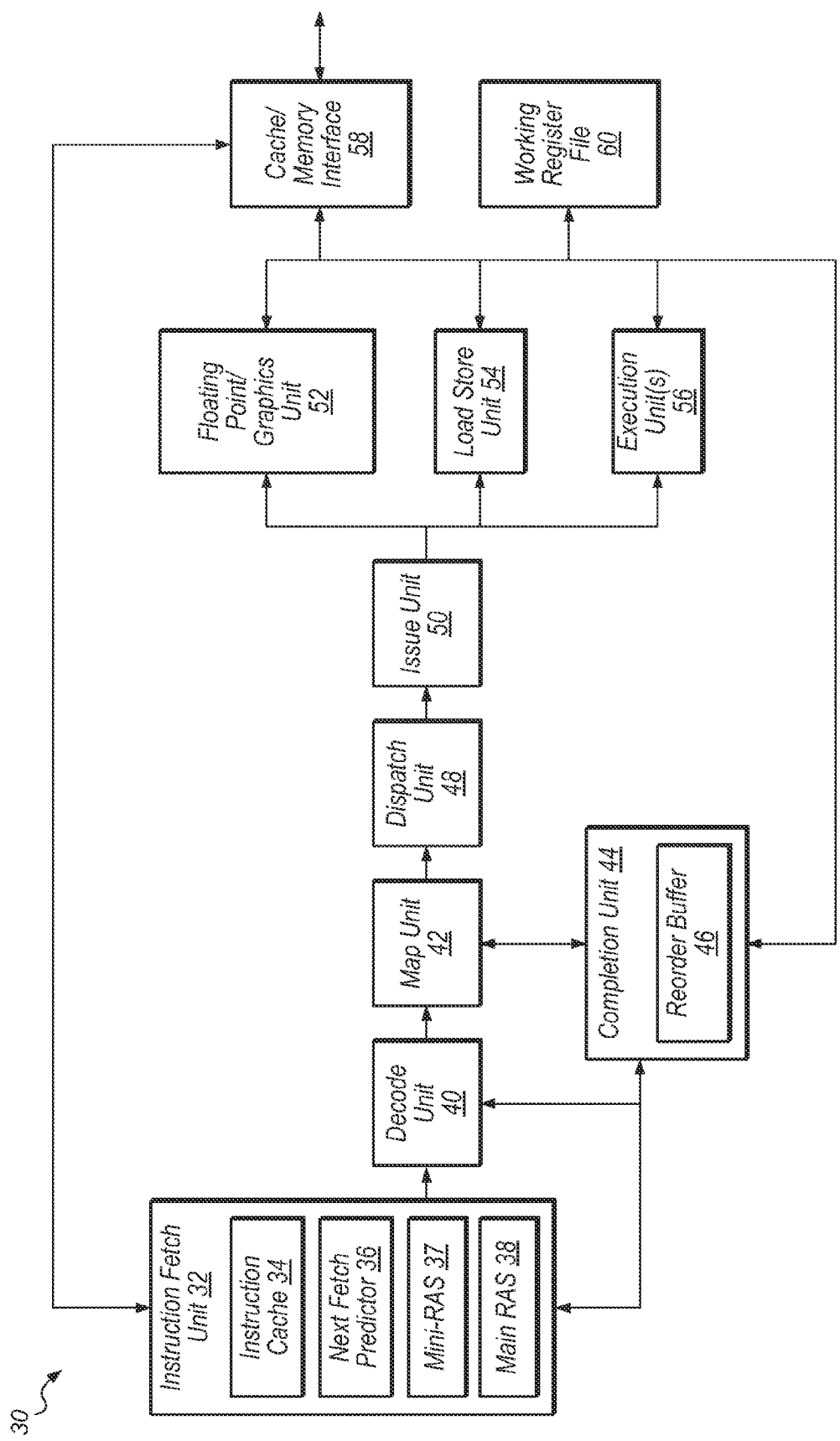
FIG. 2 is a block diagram that illustrates one embodiment of a pipeline of a processor.

Turning now to FIG. 2, a block diagram illustrating one embodiment of a pipeline of processor 30 is shown. Processor 30 is one example of a processor core, and processor 30 may be utilized within a processor complex, such as processor complex 12 of FIG. 1. In one embodiment, each of CPUs 14 and 16 of FIG. 1 may include the components and functionality of processor 30. It is noted that processor 30 may include other components and interfaces not shown in FIG. 2

Processor 30 includes instruction fetch unit (IFU) 32 which includes an instruction cache 34, next fetch predictor 36, mini return address stack (RAS) 37, and main RAS 38. IFU 32 may also include a number of data structures in addition to those shown, such as a branch predictor, an instruction translation lookaside buffer (ITLB), instruction buffers, and/or other structures configured to store state that is relevant to thread selection and processing (in multi-threaded embodiments of processor 30.

IFU 32 is coupled to an instruction processing pipeline that begins with a decode unit 40 and proceeds in turn through a map unit 42, a dispatch unit 48, and issue unit 50. Issue unit 50 is coupled to issue instructions to any of a number of instruction execution resources including execution unit(s) 56, a load store unit (LSU) 54, and/or a floating-point/graphics unit (FGU) 52. These instruction execution resources are coupled to a working register file 60. Additionally, LSU 54 is coupled to cache/memory interface 58. Reorder buffer 46 is coupled to IFU 32, decode unit 40, working register file 60, and the outputs of any number of instruction execution resources. It is noted that the illustrated embodiment is merely one example of how processor 30 may be implemented. Alternative configurations and variations are possible and contemplated.

In one embodiment, IFU 32 may be configured to fetch instructions from instruction cache 34 and buffer them for downstream processing, request data from a cache or memory through cache/memory interface 58 in response to instruction cache misses, and predict the direction and target of control transfer instructions (e.g., branches). Next fetch predictor 36 may be configured to generate a next fetch PC address at an early stage of the pipeline. The next fetch PC address generated by next fetch predictor 36 may be verified later in the pipeline by comparison to a prediction from a branch predictor (not shown).

Main RAS 38 is a branch target predictor structure designed to predict subroutine return branches with high accuracy. Main RAS 38 may be a stack of return addresses using a last-in, first-out (LIFO) structure. Return addresses may be pushed onto main RAS 38 by subroutine call branches and return addresses may be popped off of main RAS 38 by subroutine return branches. The return address may be calculated as the next sequential PC address after the subroutine call branch address. Main RAS 38 may be located at an intermediate pipeline stage after the PC fetch address is generated but before retirement of instructions.

Mini-RAS 37 is also a branch target predictor structure designed to predict subroutine return branches, but at an earlier pipeline stage then main RAS 38. Mini-RAS 37 may be implemented using a variety of different structures and logic, depending on the embodiment. In one embodiment, mini-RAS 37 may be a stack of return addresses similar to main RAS 38. This stack may be updated early in the processor pipeline as call and return instructions are detected. In another embodiment, mini-RAS 37 may utilize other types of circuitry (e.g., a lookup table) to generate a branch target prediction based on one or more inputs. The one or more inputs to mini-RAS 37 may be coupled from the pipeline stages in between mini-RAS 37 and main RAS 38. For example, any call or return instructions in flight toward main RAS 38 may be pipelined back to mini-RAS 37 so as to generate the appropriate branch target prediction. Mini-RAS 37 may also include logic for generating a next fetch PC address based on any in-flight call instructions. Call or return instructions may be referred to as "in-flight" if these instructions have already passed the pipeline stage with mini-RAS 37 but have not yet reached and updated the pipeline stage of main RAS 38.

IFU 32 may convey fetched instruction data to decode unit 40. In one embodiment, decode unit 40 may be configured to prepare fetched instructions for further processing. Decode unit 40 may be configured to identify the particular nature of an instruction (e.g., as specified by its opcode) and to determine the source and destination registers encoded in an instruction, if any. Map unit 42 may be configured to map the decoded instructions (or uops) to physical registers within processor 30. Map unit 42 may also implement register renaming to map source register addresses from the uops to the source operand numbers identifying the renamed source registers. Dispatch unit 48 may be configured to dispatch uops to reservation stations (not shown) within the various execution units.

Issue unit 50 may be configured to provide instruction sources and data to the various execution units for picked (i.e., scheduled or dispatched) instructions. In one embodiment, issue unit 50 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, processor 30 includes a working register file 60 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 50 may proceed to one or more of the illustrated execution units to be performed. In one embodiment, each of execution unit(s) 56 is similarly or identically configured to perform certain integer-type instructions defined in the implemented ISA, such as arithmetic, logical, and shift instructions. In some embodiments, architectural and non-architectural register files are physically implemented within or near execution unit(s) 56. It is contemplated that in some embodiments, processor 30 may include any number of integer execution units, and the execution units may or may not be symmetric in functionality.

Load store unit 54 may be configured to process data memory references, such as integer and floating-point load and store instructions and other types of memory reference instructions. LSU 54 may include a data cache (not shown) as well as logic configured to detect data cache misses and to responsively request data from a cache or memory through cache/memory interface 58. In one embodiment, a data cache in LSU 54 may be configured as a set-associative, write-through cache in which all stores are written to a higher-level (e.g., L2) cache regardless of whether they hit in the data cache.

In various embodiments, LSU 54 may implement a variety of structures configured to facilitate memory operations. For example, LSU 54 may implement a data TLB to cache virtual data address translations, as well as load and store buffers configured to store issued but not-yet-committed load and store instructions for the purposes of coherency snooping and dependency checking LSU 54 may include a miss buffer configured to store outstanding loads and stores that cannot yet complete, for example due to cache misses. In one embodiment, LSU 54 may implement a store queue configured to store address and data information for stores that have committed, in order to facilitate load dependency checking LSU 54 may also include hardware configured to support atomic load-store instructions, memory-related exception detection, and read and write access to special-purpose registers (e.g., control registers).

Floating-point/graphics unit (FGU) 52 may be configured to perform and provide results for certain floating-point and graphics-oriented instructions defined in the implemented ISA. For example, in one embodiment FGU 52 implements single- and double-precision floating-point arithmetic instructions compliant with the IEEE floating-point standards, such as add, subtract, multiply, divide, and certain transcendental functions.

In the illustrated embodiment, completion unit 44 includes reorder buffer (ROB) 46 and coordinates transfer of speculative results into the architectural state of processor 30. Entries in ROB 46 may be allocated in program order. Completion unit 44 may include other elements for handling completion/retirement of instructions and/or storing history including register values, etc.

In some embodiments, speculative results of instructions may be stored in ROB 46 before being committed to the architectural state of processor 30, and confirmed results may be committed in program order. Entries in ROB 46 may be marked as completed when their results are allowed to be written to the architectural state. Completion unit 44 may also be configured to coordinate instruction flushing and/or replaying of instructions.

Figure 3:
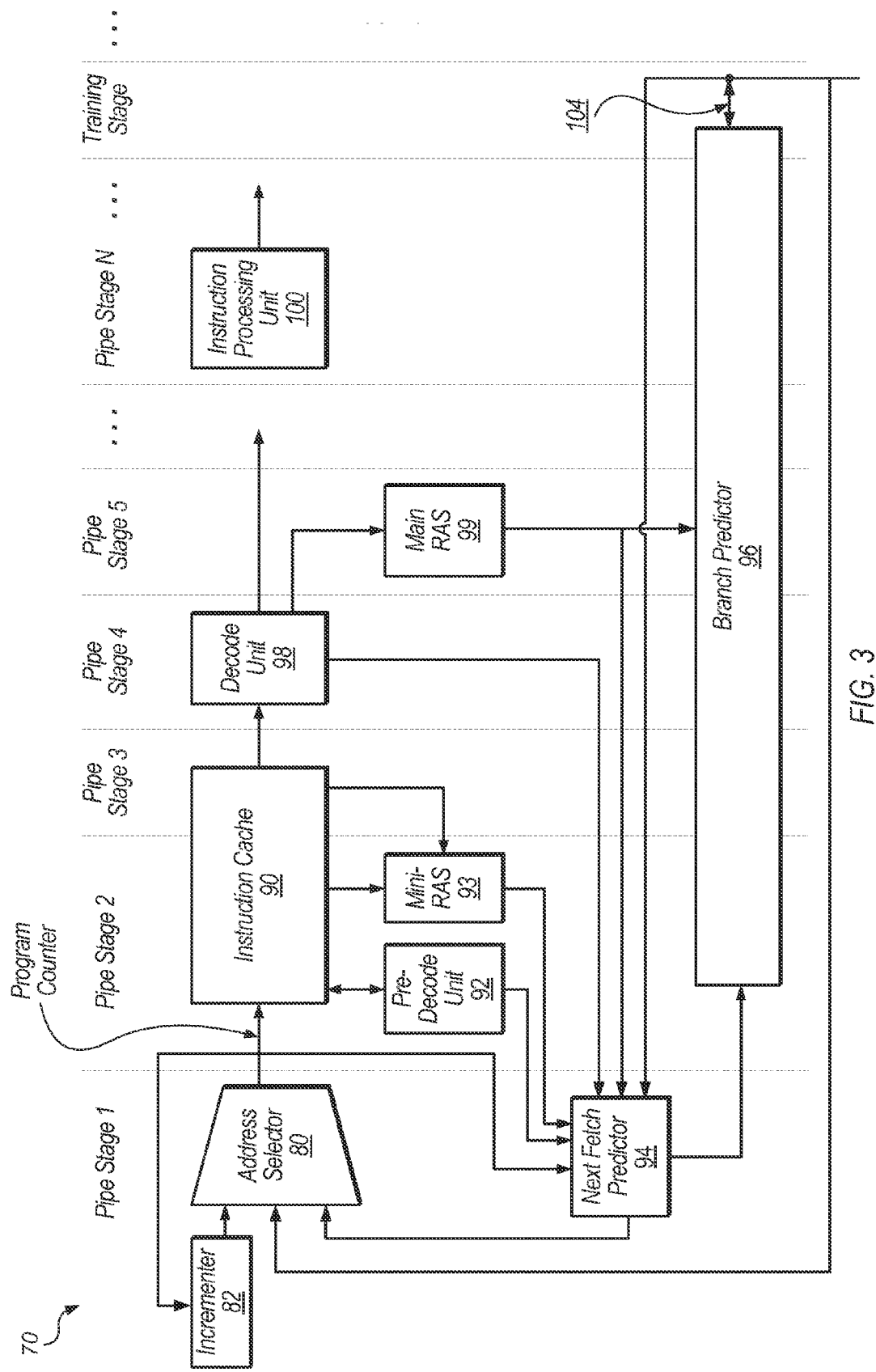
FIG. 3 is a block diagram illustrating one embodiment of a front end of a processor pipeline.

Referring to FIG. 3, a generalized block diagram illustrating one embodiment of a front-end pipeline 70 of a processor is shown. In the embodiment shown, pipeline 70 is a multi-stage pipeline for the processing of instructions. The concept of a processor "pipeline" is well understood, and refers to the concept of splitting the "work" a processor performs on instructions into multiple stages. In one embodiment, instruction decode, dispatch, execution, and retirement may be examples of different pipeline stages. Various pipeline stages perform such steps on an instruction during one or more processor clock cycles and then pass the instruction and/or operations associated with the instruction on to other stages for further processing. Many different pipeline architectures are possible with varying orderings of elements.

An instruction cache 90 may store instructions for a software application (e.g., a user application, operating system) executing on the processor. One or more instructions indicated by a program counter (PC) address conveyed by the address selector 80 are fetched (i.e., retrieved) from the instruction cache 90. Multiple instructions may be fetched from the instruction cache 90 per clock cycle if there are no instruction cache misses (i.e., the requested instructions are currently located in instruction cache 90).

In certain embodiments, the processor may implement an address translation scheme allowing one or more virtual address spaces to be made visible to executing software. Memory accesses within the virtual address space may be translated to a physical address space corresponding to the actual physical memory available to the processor. In embodiments of processors that employ address translation, instruction cache 90 may be partially or completely addressed using physical address bits rather than virtual address bits. For example, in one embodiment, instruction cache 90 may use virtual address bits for cache indexing and physical address bits for cache tags. In order to avoid the cost of performing a full memory translation when performing a cache access, the processor may store a set of recent and/or frequently used virtual-to-physical address translations in a translation lookaside buffer (TLB), which is not shown in FIG. 3.

In the embodiment shown, the current fetch address supplied to instruction cache 90 comes from address selector 80. In this particular implementation, selector 80 receives three different inputs (other numbers of inputs are possible depending on what sort of prediction logic is used). One input to selector 80 is supplied by incrementer 82, which supplies a next sequential PC address (i.e., the next PC assuming that there is not a taken branch). Other inputs are supplied to selector 80 by next fetch predictor 94 and branch predictor 96. As can be seen from the depiction of pipeline stages in FIG. 3, next fetch predictor 94 is configured to generate an address prediction prior to predictions generated by branch predictor 96.

In one embodiment, next fetch predictor 94 may generate a non-sequential PC address based on a prediction for a given branch or other control transfer instruction. Next fetch predictor 94 may generate the PC address relatively faster than a corresponding prediction for the given branch instruction that is made by branch predictor 96. In some embodiments, next fetch predictor 94 accesses branch prediction information based on the PC address.

In one embodiment, branch predictor 96 may receive at least a portion of the PC address used to fetch instructions from the instruction cache 90. Using this and other information, branch predictor 96 may perform a prediction of the direction and target of a branch instruction that was predicted by next fetch predictor 94. The prediction of branch predictor 96 may, in many embodiments, be relatively slower (and thus more accurate) than the prediction generated by next fetch predictor 94. For instance, branch predictor 96 may combine, in a separate hash function, at least a portion of the received PC address with another portion of itself or with other values, such as history information. Various hashing functions may be performed to determine an index to one or more pattern history tables (PHTs), branch target buffers (BTBs), and/or other tables used to provide branch prediction data 104. The branch prediction data 104 may include a branch direction and a branch target address. The branch predictor 96 may utilize multiple clock cycles to both determine the outcome of the condition of a branch instruction and to determine the branch target address.

The branch predictor 96 may thus provide branch prediction data 104 with higher prediction accuracy than the next fetch predictor 94. For performance reasons, however, it may be desirable to obtain a faster prediction. Therefore, the next fetch predictor 94 may be used to provide a quick, initial branch prediction. In the illustrated embodiment, next fetch predictor 94 provides a predicted next address to instruction cache 90 through address selector 80. In other embodiments, next fetch predictor 94 may provide predicted fetch address to instruction cache 90 through other communication paths. The branch predictor 96 may perform a parallel, slower branch prediction, which may or may not confirm the prediction generated by next fetch predictor 94.

The prediction data generated by the next fetch predictor 94 may be stored and staged along the pipeline so as to be made available to various pipeline stages. The staged prediction data may be compared to prediction data generated at a later pipeline stage by the branch predictor 96 or completion data generated from execution and completion of branch instructions. When the next fetch predictor 94 generates branch prediction data that does not match prediction data 104 generated by the branch predictor 96 at a later time, the next fetch predictor 94 may be updated or trained with the prediction data 104 generated by the branch predictor 96 (e.g., during the training stage of FIG. 3). Next fetch predictor 94 may be similarly trained at retirement or completion of relevant instructions. Note that the training stage may precede pipeline stage N in some embodiments. It is also noted that the ordering of pipeline stages in FIG. 3 is intended to be representative of one embodiment and not to exclude other implementations.

Decode unit 98 may, in one embodiment, decode the opcodes of the multiple fetched instructions. Decode unit 98 may send the instructions with additional decoded information to other components in the processor for instruction processing in later pipeline stages. These later pipeline stages are generically represented by instruction processing unit 100. For example, the decode unit 98 may allocate entries in a dispatch queue. Register renaming, instruction scheduling, executing arithmetic operations and/or performing memory accesses, and in-order retiring are just some examples of later instruction processing steps. In one embodiment, decode unit 98 may forward data to a later pipeline stage while bypassing other pipeline stages. For example, decode unit 98 may decode branch instructions and forward decoded instruction information to next fetch predictor 94 and/or branch predictor 96.

Pre-decode unit 92 may be configured to scan the cache lines stored in instruction cache 90 for branch instructions. Alternatively, pre-decode unit 92 may be configured to scan cache lines for branch instructions as the cache lines are fetched and stored in instruction cache 90. In one embodiment, pre-decode unit 92 may detect call branch instructions (or calls, for short) and return branch instructions (or returns, for short) and generate pre-decode bits so as to notify next fetch predictor 94 of these call and return branch instructions. In another embodiment, next fetch predictor 94 may receive an indication from decode unit 98 of detected call and return branch instructions. Next fetch predictor 94 may include an entry for each detected branch instruction, and in one embodiment, each entry may include an indicator that indicates if the respective branch instruction is a call or a return.

In one embodiment, the pre-decode information generated by pre-decode unit 92 may be stored with the instruction data in instruction cache 90. When instructions are fetched out of the instruction cache 90, the corresponding pre-decode information may also be fetched out of instruction cache 90. The instructions and corresponding pre-decode information may be conveyed to decode unit 98.

In one embodiment, main return address stack (RAS) 99 may be configured to store return addresses for call instructions that is encountered in the instruction stream. When a first call instruction is encountered, the return address associated with the first call instruction is pushed onto main RAS 99. If more call instructions are encountered, the corresponding return addresses are pushed onto main RAS 99. When a return instruction is encountered, a return address is popped from the top of main RAS 99 and used as the location from which to fetch new instructions for the instruction stream.

In one embodiment, main RAS 99 may be updated during pipe stage 5. In other embodiments, main RAS 99 may be updated at other pipe stages (e.g., pipe stage 4, pipe stage 6). One or more return addresses from main RAS 99 may be coupled back to next fetch predictor 94. In one embodiment, when a return branch instruction is detected in the current fetch group of instructions from instruction cache 90, next fetch predictor 94 may utilize the top of main RAS 99 as the branch target prediction for the encountered return branch instruction. This may reduce the probability of a misprediction for subroutines that are called from multiple locations.

In one embodiment, mini return address stack (RAS) 93 may be configured to generate a branch target prediction during pipe stage 2 of the processor pipeline. In other embodiments, mini-RAS 93 may generate a branch target prediction during other pipe stages (e.g., pipe stage 1, pipe stage 3). In one embodiment, mini-RAS 93 may store one or more return addresses in a stack. Mini-RAS 93 may be a separate structure from main RAS 99 and may have different addresses stored in its stack at any given time, depending on the specific instruction flow. For example, a call instruction A may be fetched from instruction cache 90 in pipe stage 1, and for purposes of discussion, it will be assumed that call instruction A has a corresponding return address B. In one embodiment, return address B may be calculated by adding an offset to the fetch address of call instruction A. During pipe stage 2, return address B may be pushed onto mini-RAS 93. At this point in time, main RAS 99 will have a different address stored on the top of its stack. Not until call instruction A reaches pipe stage 5 will return address B be pushed onto main RAS 99.

In this example, for three clock cycles, mini-RAS 93 will have return address B at the top of the stack and main RAS 99 will have a different return address corresponding to a previous call instruction at the top of its stack. If a return instruction is fetched from instruction cache 90 during these three clock cycles, next fetch predictor 94 may use the top of mini-RAS 93 to generate its branch target prediction rather than using the top of main RAS 99.

Figure 4:
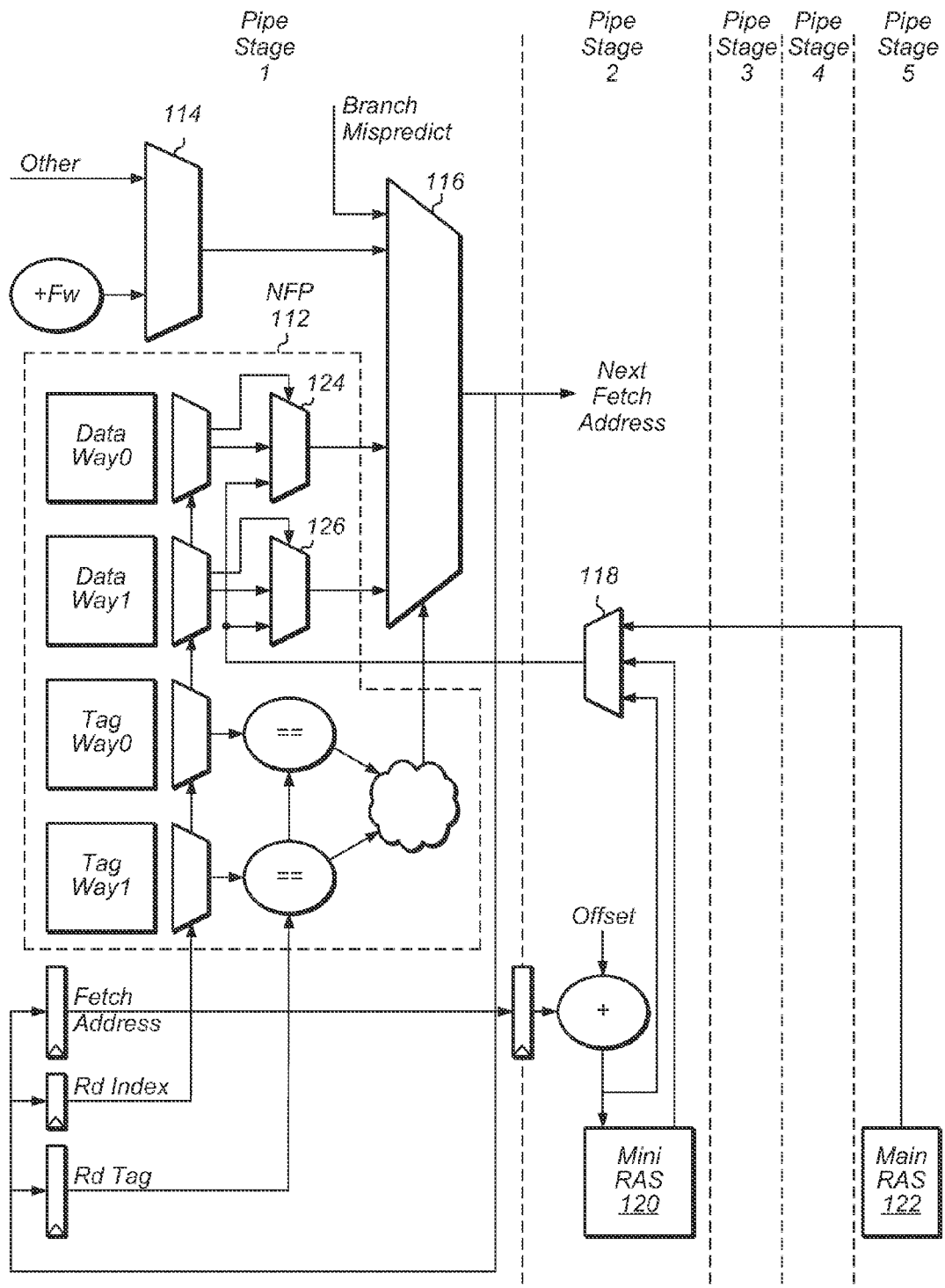
FIG. 4 is a block diagram illustrating one embodiment of circuitry for generating a next fetch address.

Referring now to FIG. 4, a block diagram illustrating one embodiment of circuitry for generating a next fetch address is shown. In one embodiment, next fetch predictor (NFP) 112 may include a cache with data ways 0-1 and tag ways 0-1 for storing entries corresponding to fetch addresses associated with branch instructions. In other embodiments, NFP 112 may include other numbers of data and tag ways. In further embodiments, NFP 112 may utilize other types of storage elements and other supporting logic.

The output of NFP 112 may be a prediction for a next fetch address based on the current fetch address. In one embodiment, NFP 112 may generate the prediction for the next fetch address in a single clock cycle. The predictions generated by NFP 112 (for data ways 0-1) may be coupled as inputs to mux 116. Only one of the data ways 0-1 may have a valid prediction, which will be selected according to which tag way 0-1 is hit by the current fetch address.

The other inputs to mux 116 are coupled from the output of mux 114 and the output of branch predictor (not shown) for branch mispredictions that result in a redirect of the processor pipeline. When the current fetch address does not hit in NFP 112, then mux 116 will select the output of mux 114 as the next fetch address. Mux 114 may pass through the next sequential address in these cases, since the miss of NFP 112 indicates the current fetch address does not correspond to a branch instruction.

In one embodiment, each entry of NFP 112 may include an indicator to specify if the entry is associated with a return branch instruction. If a hit entry in data way 0 or 1 is associated with a return branch instruction, then the corresponding mux 124 or 126 will couple the output of mux 118 to the input of mux 116. The output of mux 118 may be a return address generated from either mini RAS 120, main RAS 122, or an offset applied to a recent fetch address for an in-flight call branch instruction. In one embodiment, the offset may be stored in NFP 112. When a lookup of NFP 112 results in a hit for a call branch instruction, the corresponding offset may be retrieved and used to calculate the return address for the call branch instruction. The output of mux 118 may be selected based on whether or not there are any in-flight call or return instructions toward main RAS 122. In some embodiments, there may be additional circuitry to pipeline the instructions and/or fetch addresses from pipe stages 2-4 back to mini RAS 120. This additional circuitry is not shown in FIG. 4 to avoid obscuring the figure.

Figure 5:
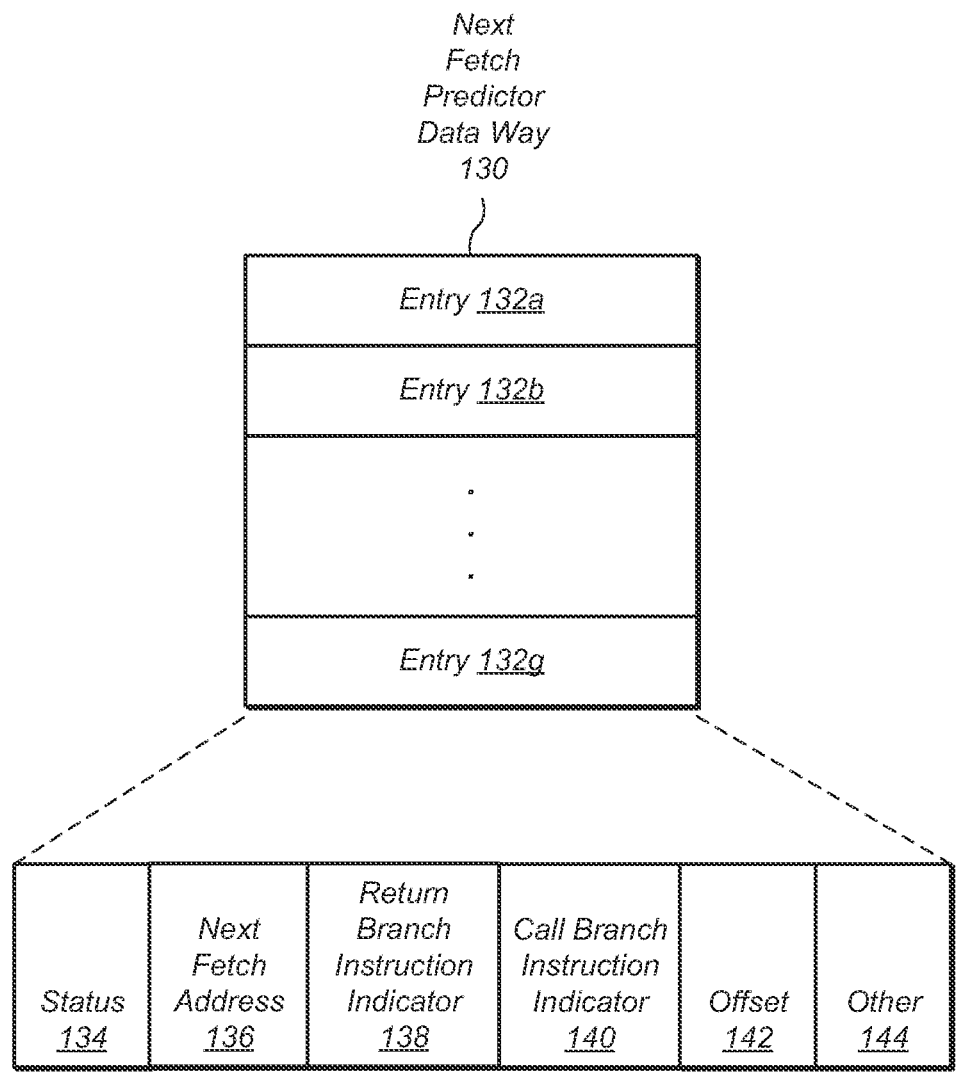
FIG. 5 illustrates one embodiment of a next fetch predictor data way.

Referring now to FIG. 5, one embodiment of a next fetch predictor data way is shown. Next fetch predictor data way 130 may include entries 132a-g, which are representative of any number of entries. Additionally, the next fetch predictor may include any number of data ways. Each entry 132a-g may include multiple fields, with the entry 132g expanded to shown one embodiment of an entry and the fields it contains. An individual entry of entries 132a-g may be selected based on a hash function applied to one or more portions of the current fetch address. If the current fetch address hits in the tag memory (not shown), then a corresponding entry in data way 130 may be selected.

Entry 132g may include a status 134 indicator to specify the current status of the entry. Entry 132g may also include a next fetch address 136 field for storing the prediction of the next fetch address based on the current fetch address. Entry 132g may also include a return branch instruction indicator 138 field which indicates if the entry corresponds to a return branch instruction. In one embodiment, a value of '1' in field 138 indicates the entry corresponds to a return branch instruction and a value of '0' indicates the entry corresponds to another type of branch instruction. If the entry corresponds to a return branch instruction, then the next fetch address 136 field may be ignored when this entry is hit by a current fetch address. Instead, a main RAS or mini-RAS may be used to generate the next fetch address for a return branch instruction. Additionally, in one embodiment, if a return branch instruction is in-flight toward the main RAS, then the field 138 may be pipelined to the mini-RAS so that the mini-RAS generates the appropriate address prediction.

Entry 132g may also include a call branch instruction indicator 140 to indicate if the entry corresponds to a call branch instruction. This indicator may also be pipelined to the mini-RAS while a detected call branch instruction is in-flight toward the main RAS. In this case, if a new return branch instruction is fetched from the instruction cache, the next fetch predictor will generate a return address associated with the in-flight call branch instruction rather than using the address at the top of the main RAS.

Entry 132g may also include an offset field 142 to store the offset from the fetch address to the actual call instruction within the fetch group. In some embodiments, the actual call branch position and therefore its PC may not be known yet at the early pipeline stages, and therefore, the offset for a call branch instruction may be stored in entry 132g. For example, a given fetch address may be 0x1004 and a call branch within the fetch group may be at address 0x1010. If the call branch size is 4 bytes (this may vary from embodiment to embodiment), then the return address for this call branch would be $0x10^{14}$. The offset for this particular call branch would be the difference between the fetch address (0x1004) and the return address ($0x10^{14}$). Therefore, in this case, the offset would be 0x10. This offset could be stored in offset field 142 of the corresponding entry for this call branch.

In one embodiment, the NFP may be looked up in fetch stage one. For the purposes of this discussion, assume that a return branch is hit in the lookup of the NFP and assume that there is a call branch in pipe stage 2. In this scenario, the return address may be calculated on the fly using the call branch fetch address and the offset that is read out of the NFP for this call branch. This return address calculated in the fetch stage 2 can forwarded back to fetch stage 1 and also be pipelined forward along side the call branch as the call branch moves through the pipeline.

Entry 132g may also include other field 144, which is representative of any number of additional fields with extra information which may be included within entry 132g. It is noted that in other embodiments, the entries 132a-g may be organized differently than what is shown in FIG. 5. In other embodiments, one or more fields shown in FIG. 5 may be omitted and one or more other fields may be added to the entries 132a-g.

Figure 6:
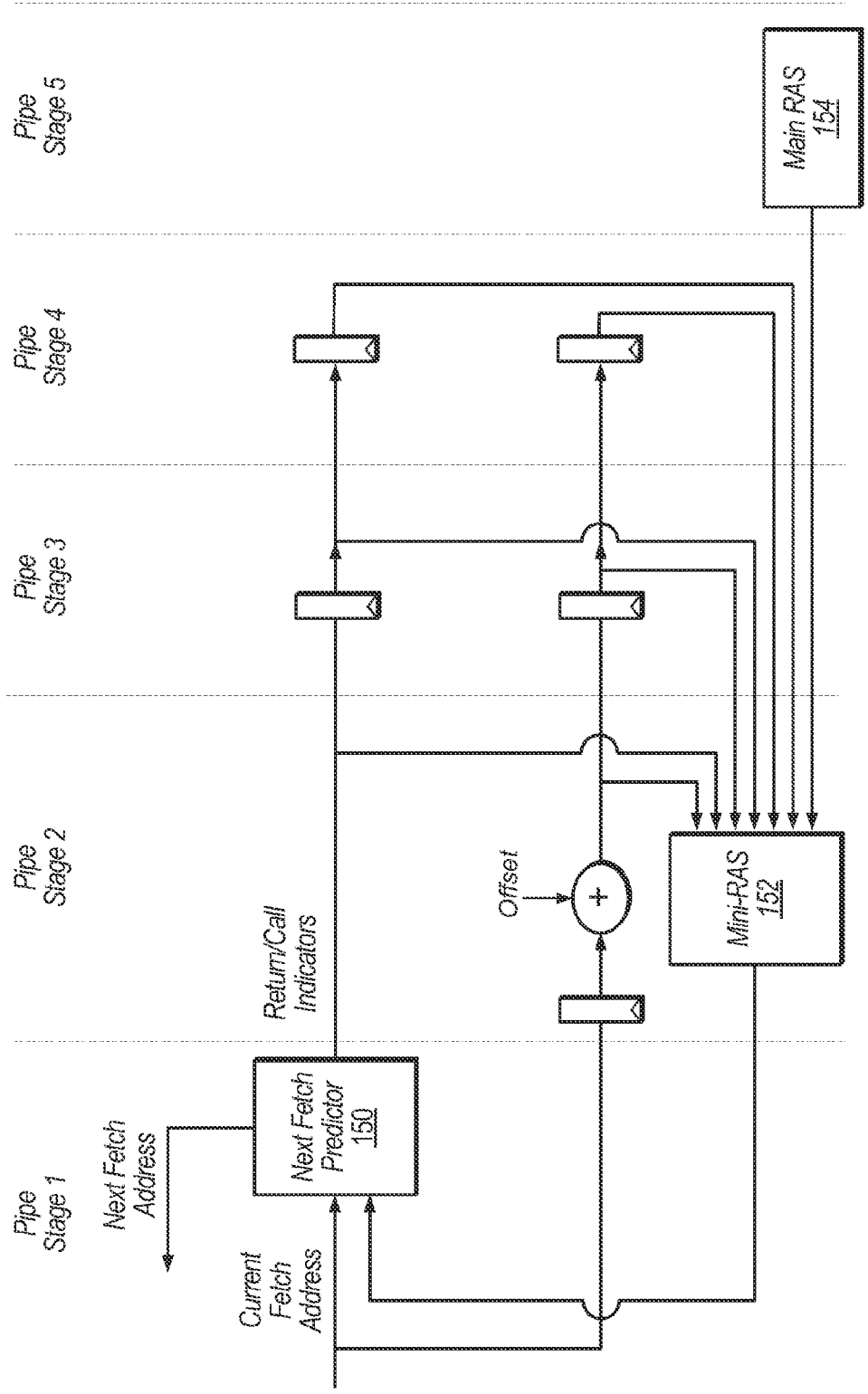
FIG. 6 is a block diagram illustrating another embodiment of circuitry for generating a next fetch address.

Turning now to FIG. 6, a block diagram of another embodiment of circuitry for generating a next fetch address is shown. In one embodiment, mini-RAS 152 may include logic for selecting the appropriate predicted next fetch address based on the inputs from next fetch predictor 150. Specifically, the logic may select the address based on the return and call indicators from the most recently hit entries of next fetch predictor 150. The type of logic including within mini-RAS 152 may vary from embodiment to embodiment. For example, in one embodiment, mini-RAS 152 may include a mux and logic for calculating the select for the mux. The logic may examine whether there are any return or call branches in flight, and if so, the logic figures out where to forward the return address from depending on how many return and call branches are in-flight and their relative positions within the pipeline.

In one embodiment, mini-RAS 152 may also receive a status indicator to indicate the result (e.g., hit or miss) of each recent lookup of next fetch predictor 150. If a recent lookup of the next fetch predictor 150 was a hit, then mini-RAS 152 may utilize the call and return indicators for this lookup. Otherwise, if a recent lookup was a miss, then mini-RAS 152 may ignore the call and return indicators for this lookup since this indicates there were only non-branch instructions in the corresponding fetch group.

In one embodiment, if there is an in-flight return instruction toward main RAS 154, then the second address from the top of main RAS 154 may be used as the next fetch address if a new return instruction is detected in pipe stage 1. Similarly, if there are two in-flight return instructions, then the third address from the top of main RAS 154 may be used as the next fetch address if a new return instruction is detected in pipe stage 1.

In one embodiment, multiple addresses may be coupled from main RAS 154 to mini-RAS 152 so that mini-RAS 152 may generate the most accurate next fetch address in these scenarios. Alternatively, in another embodiment, mini-RAS 152 may maintain its own stack structure and may select from the top of its own stack in these scenarios. In the case where there are one or more return instructions toward main RAS 154, these return instructions will have already been popped off the top of the stack from mini-RAS 152 and so mini-RAS 152 will have the proper address for a newly detected return instruction in pipe stage 1 while there are one or more in-flight returns toward main RAS 154.

It is noted that the logic shown in FIG. 6 is merely a simplified example of the type of supporting logic that may be implemented. Additional logic may be utilized and may be incorporated within the processor pipeline in other embodiments. It is further noted that in other embodiments, there may be other numbers of pipe stages between the mini-RAS and main RAS, and in these embodiments the logic shown in FIG. 6 may be modified accordingly.

It is further noted that some of the logic shown as being located outside of mini-RAS 152 in FIG. 6 may be included within mini-RAS 152 in other embodiments. Similarly, some of the logic implemented within next fetch predictor 150 may be incorporated within mini-RAS 152 in other embodiments. Alternatively, some of the logic implemented within mini-RAS 152 may be included within next fetch predictor 150 in other embodiments. Generally speaking, the logic shown in any of the mini-RAS and next fetch predictors shown in this disclosure may be split up in any suitable manner between the mini-RAS and next fetch predictor. For example, in one embodiment, the mini-RAS may be located within the next fetch predictor.

Figure 7:
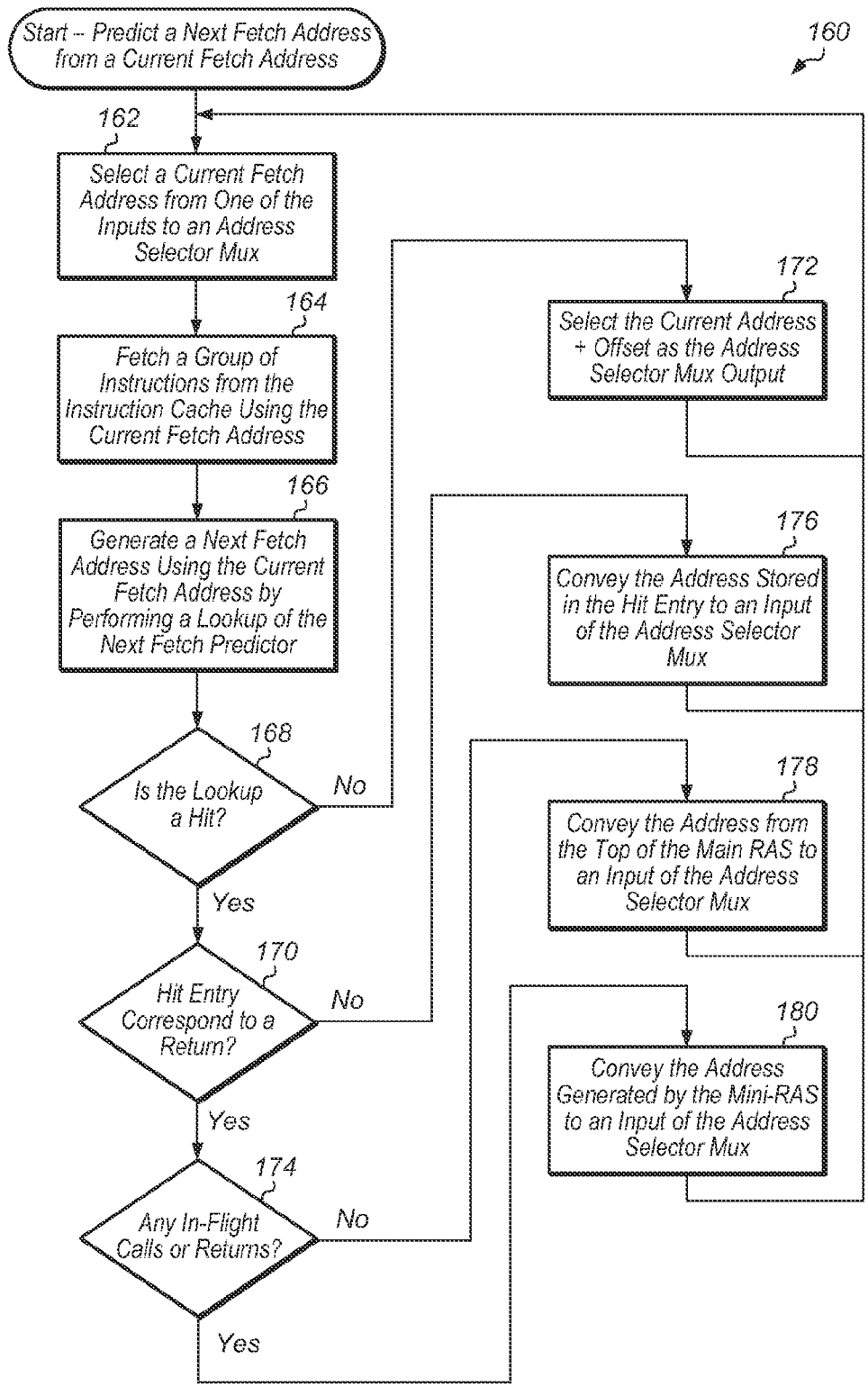
FIG. 7 is a generalized flow diagram illustrating one embodiment of a method for predicting a next fetch address from a current fetch address.

Referring now to FIG. 7, one embodiment of a method 160 for predicting a next fetch address from a current fetch address is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In a first stage of a processor pipeline, a current fetch address may be selected from one of the inputs to an address selector mux (block 162). In one embodiment, the select signal coupled to the address selector mux may be generated by a next fetch predictor. Next, a group of instructions may be fetched from an instruction cache using the current fetch address (block 164). Simultaneously, while fetching instructions using the current fetch address, the next fetch predictor may use the current fetch address to predict the next fetch address (block 166). In one embodiment, a lookup of the next fetch predictor may be performed with the current fetch address so as to generate a prediction of the next fetch address.

If the lookup of the next fetch predictor is a hit (conditional block 168, "yes" leg), then it may be determined if the hit entry in the next fetch predictor is associated with a return branch instruction (conditional block 170). If the lookup is a miss (conditional block 168, "no" leg), then the next fetch predictor may generate a select signal to the address selector mux so that next sequential address input is selected on the next clock cycle (block 172). The next sequential address may be equal to the current fetch address plus an offset equal to the number of bytes fetched in a single cycle. It is noted that this offset is a different value than the offset stored in the NFP. The offset stored in the NFP is used to calculate the return branch position from the start of the corresponding fetch address for an in-flight call branch. After block 172, method 160 may return to block 162 and generate the current fetch address using the next sequential address input to the address selector mux.

If the hit entry in the next fetch predictor corresponds to a return branch instruction (conditional block 170, "yes" leg), then the next fetch predictor may determine if there are any call or return branch instructions in flight toward the main RAS (conditional block 174). If the hit entry in the next fetch predictor is not a return (conditional block 170, "no" leg), then the next fetch predictor may convey the address stored in the hit entry to an input of the address selector mux (block 176). After block 176, method 160 may return to block 162 and the address selector mux may select the address conveyed from the next fetch predictor as the fetch address in the subsequent clock cycle.

If no call or return branch instructions are in flight toward the main RAS (conditional block 174, "no" leg), then the next fetch predictor may convey the address from the top of the main RAS to an input of the address selector mux (block 178). After block 178, method 160 may return to block 162 and use the address retrieved from the top of the main RAS as the fetch address in the subsequent clock cycle. If there are one or more call or return branch instructions in flight toward the main RAS (conditional block 174, "yes" leg), then the next fetch predictor may convey the address generated by the mini-RAS to an input of the address selector mux (block 180). After block 180, method 160 may return to block 162 and use the address generated by the mini-RAS as the current fetch address in the subsequent clock cycle.

Figure 8:
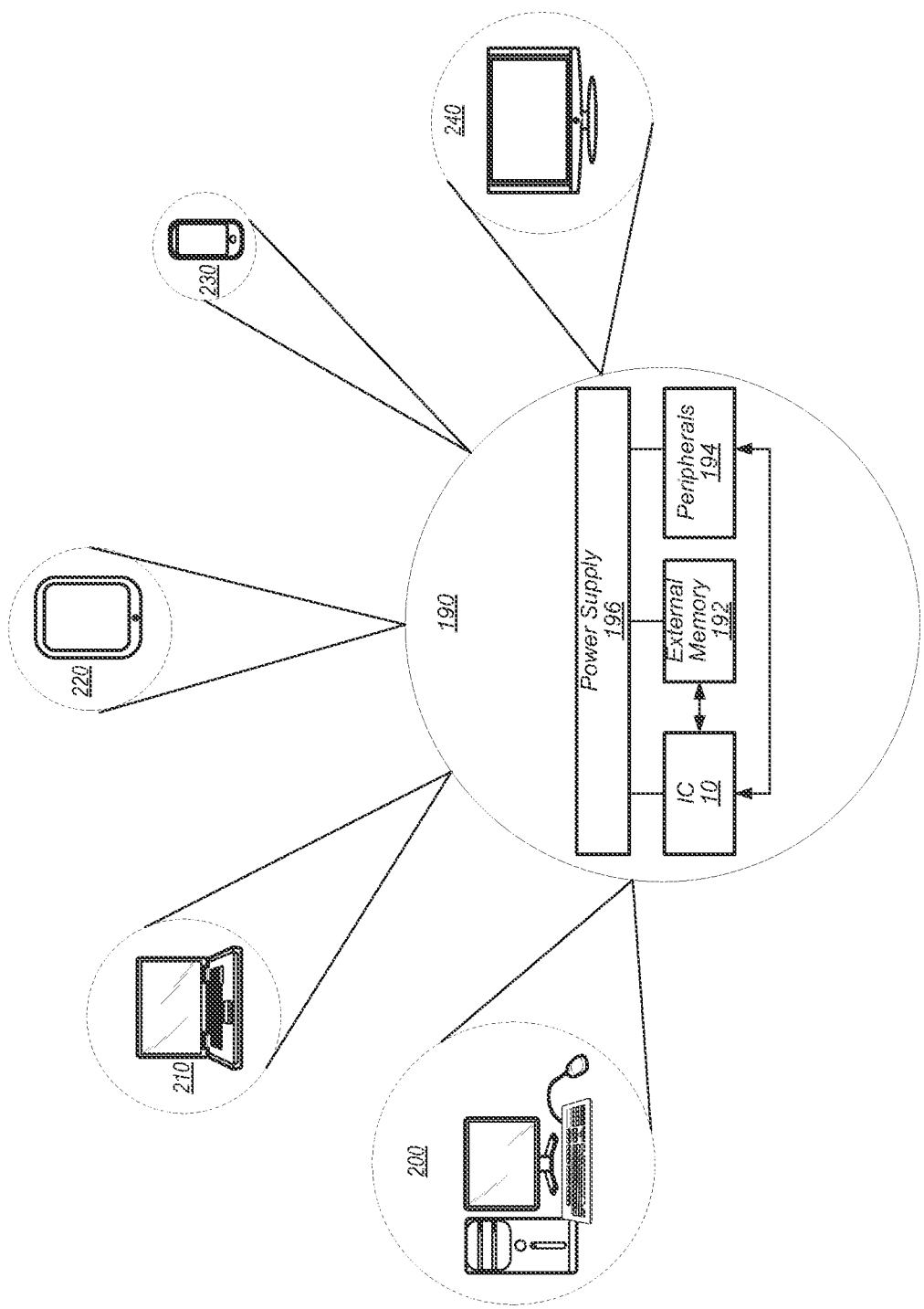
FIG. 8 is a block diagram of one embodiment of a system.

Turning next to FIG. 8, a block diagram of one embodiment of a system 190 is shown. As shown, system 190 may represent chip, circuitry, components, etc., of a desktop computer 200, laptop computer 210, tablet computer 220, cell phone 230, television 240 (or set top box configured to be coupled to a television), or otherwise. Other devices are possible and are contemplated. In the illustrated embodiment, the system 190 includes at least one instance of IC 10 (of FIG. 1) coupled to an external memory 192.

IC 10 is coupled to one or more peripherals 194 and the external memory 192. A power supply 196 is also provided which supplies the supply voltages to IC 10 as well as one or more supply voltages to the memory 192 and/or the peripherals 194. In various embodiments, power supply 196 may represent a battery (e.g., a rechargeable battery in a smart phone, laptop or tablet computer). In some embodiments, more than one instance of IC 10 may be included (and more than one external memory 192 may be included as well).

The memory 192 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multi-chip module configuration.

The peripherals 194 may include any desired circuitry, depending on the type of system 190. For example, in one embodiment, peripherals 194 may include devices for various types of wireless communication, such as wifi, Bluetooth, cellular, global positioning system, etc. The peripherals 194 may also include additional storage, including RAM storage, solid state storage, or disk storage. The peripherals 194 may include user interface devices such as a display screen, including touch display screens or multitouch display screens, keyboard or other input devices, microphones, speakers, etc.

Figure 9:
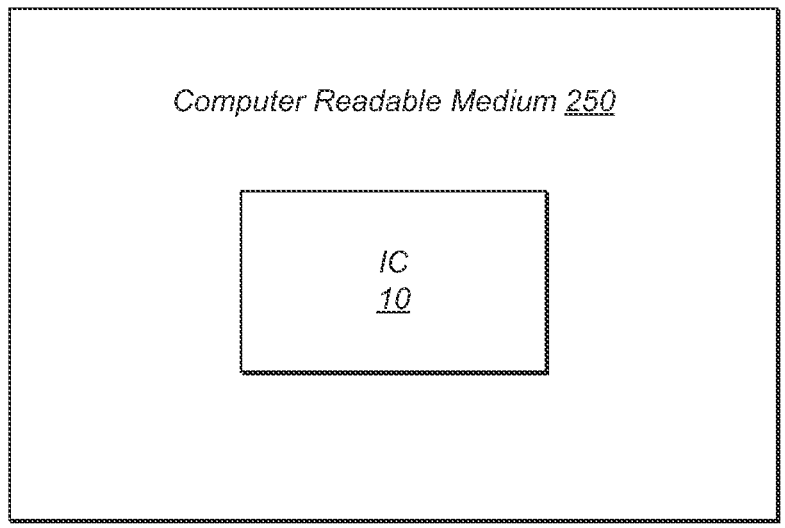
FIG. 9 illustrates one embodiment of a computer readable medium.

Referring now to FIG. 9, one embodiment of a computer readable medium 250 including one or more data structures representative of the circuitry included in IC 10 (of FIG. 1) is shown. Generally speaking, computer readable medium 250 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 250 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 250 may be the netlist(s) (with or without the synthesis library) or the data set(s), as desired. In yet another alternative, the data structures may comprise the output of a schematic program, or netlist(s) or data set(s) derived therefrom.

While computer readable medium 250 includes a representation of IC 10, other embodiments may include a representation of any portion or combination of portions of IC 10 (e.g., CPU, next fetch predictor, mini-RAS).

Turning now to FIG. 10, multiple scenarios are shown with branches at various pipeline stages of a processor. The fetch stages (or pipeline stages) are labeled F1, F2, etc. in FIG. 10, and underneath each fetch stage a branch instruction is indicated with an "R" for a return instruction and a "C" for a call instruction. The "—" indicates that the fetch group does not include a return or call branch instruction. It is noted that each fetch stage may have multiple instructions, and when a fetch stage is shown as having a return or call instruction, the stage may also include one or more other instructions as well.

For the first scenario shown in FIG. 10, a return instruction is detected in fetch stage 1 (F1), and an in-flight call instruction is at fetch stage 4. For scenario 1, the return address calculated for this call instruction may be forwarded from fetch stage 4 to fetch stage 1, and this address may be used as the next fetch address.

For scenario 2, a call instruction is in fetch stage 3 while the return instruction is detected in fetch stage 1. Therefore, the return address calculated for this call instruction may be forwarded to fetch stage 1 and used as the next fetch address. For scenario 3, there is a return instruction in stage 1, a return instruction in stage 2, and a call instruction in stage 3. In this scenario, the return instruction in stage 2 will consume the return address of the call instruction in stage 3. Therefore, the top of the return address stack may be forwarded to fetch stage 1 and used as the next fetch address. For scenario 4, there is a return instruction in stage 1, a return instruction in stage 2, a call instruction in stage 3, and a call instruction in stage 4. In this scenario, the return instruction in stage 2 will consume the return address of the call instruction in stage 3. Thus, the return address generated for the call instruction currently located in stage 4 may be forwarded back to stage 1.

It is noted that the four scenarios shown in FIG. 10 represent a small sample of the different possible scenarios that may be encountered by a processor pipeline. Other scenarios may be encountered and may be processed in a similar manner to those described above. For any possible scenario within the processor pipeline, logic (e.g., a mini-RAS) may be configured to generate the appropriate return address based on the locations of in-flight call and return instructions within the pipeline stages. The structure and arrangement of the logic may vary from embodiment to embodiment. In one embodiment, the logic may include a return address pipeline, a mux, and select logic for the mux.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
a first return address stack (RAS) configured to store return addresses for call branch instructions;
a second RAS configured to generate a prediction for a new return branch instruction when there are one or more call or return branch instructions in early pipeline stages that have not yet updated the first RAS; and
a next fetch prediction unit configured to predict a next fetch address based on a current fetch address;
wherein responsive to determining a current fetch address corresponds to a return branch instruction, the next fetch prediction unit is configured to select the prediction from the second RAS as the next fetch address if there are one or more call or return branch instructions in early pipeline stages that have not yet updated the first RAS.

2. The processor as recited in claim 1, wherein the processor further comprises a first multiplexer, wherein the output of the first multiplexer is either a return address generated from the second RAS, a return address generated from the first RAS, or an offset applied to a recent fetch address for an in-flight call branch instruction, wherein the in-flight call branch instruction has not yet updated the first RAS.

3. The processor as recited in claim 1, wherein multiple return addresses are conveyed from the first RAS to the second RAS.

4. The processor as recited in claim 1, wherein the processor is configured to forward a return address for a first in-flight call branch instruction from a later pipeline stage to an earlier pipeline stage, wherein the first in-flight call branch instruction has not yet updated the first RAS.

5. The processor as recited in claim 1, wherein the first RAS is updated in a later pipeline stage than the next fetch prediction unit predicts a next fetch address, wherein the second RAS is updated at an earlier pipeline stage than the first RAS, and wherein any call or return branch instructions in-flight toward the first RAS are pipelined back to the second RAS and utilized by the second RAS to generate the prediction for the new return branch instruction.

6. The processor as recited in claim 1, wherein a top of the second RAS has a different return address from a top of the first RAS for multiple clock cycles.

7. The processor as recited in claim 1, wherein the second RAS is configured to determine where to forward a return address from depending on how many return and call branches are in-flight and relative positions of the return and call branch instructions within pipeline stages of the processor.

8. A method comprising:
storing return addresses on a first return address stack (RAS) for call branch instructions;
generating, by a second RAS, a prediction for a new return branch instruction when there are one or more call or return branch instructions in early pipeline stages that have not yet updated the first RAS;
predicting, by a next fetch prediction unit, a next fetch address based on a current fetch address; and
wherein responsive to determining a current fetch address corresponds to a return branch instruction, selecting the prediction from the second RAS as the next fetch address if there are one or more call or return branch instructions in early pipeline stages that have not yet updated the first RAS.

9. The method as recited in claim 8, further comprising a first multiplexer generating an output from either a return address generated from the second RAS, a return address generated from the first RAS, or an offset applied to a recent fetch address for an in-flight call branch instruction, wherein the in-flight call branch instruction has not yet updated the first RAS.

10. The method as recited in claim 8, further comprising conveying multiple return addresses from the first RAS to the second RAS.

11. The method as recited in claim 8, further comprising forwarding a return address for a first in-flight call branch instruction from a later pipeline stage to an earlier pipeline stage, wherein the first in-flight call branch instruction has not yet updated the first RAS.

12. The method as recited in claim 8, further comprising:
updating the first RAS in a later pipeline stage than the next fetch prediction unit predicts a next fetch address;

updating the second RAS at an earlier pipeline stage than the first RAS; and pipelining any call or return branch instructions which are in-flight toward the first RAS back to the second RAS; and utilizing, by the second RAS, the call or return branch instructions to generate the prediction for the new return branch instruction.

13. The method as recited in claim 8, wherein a top of the second RAS has a different return address from a top of the first RAS for multiple clock cycles.

14. A system comprising:
a processor; and
a memory;
wherein the processor comprises:
  a next fetch prediction unit configured to predict a next fetch address based on a current fetch address;
  a first return address stack (RAS) configured to store return addresses for call branch instructions; and
  a second RAS configured to generate a prediction for a new return branch instruction when there are one or more call or return branch instructions in early pipeline stages that have not yet updated the first RAS;
  wherein responsive to determining a current fetch address corresponds to a return branch instruction, the next fetch prediction unit is configured to select the prediction from the second RAS as the next fetch address if there are one or more call or return branch instructions in early pipeline stages that have not yet updated the first RAS.

15. The system as recited in claim 14, wherein the processor further comprises a first multiplexer, wherein the output of the first multiplexer is either a return address generated from the second RAS, a return address generated from the first RAS, or an offset applied to a recent fetch address for an in-flight call branch instruction, wherein the in-flight call branch instruction has not yet updated the first RAS.

16. The system as recited in claim 14, wherein multiple return addresses are conveyed from the first RAS to the second RAS.

17. The system as recited in claim 14, wherein the processor is configured to forward a return address for a first in-flight call branch instruction from a later pipeline stage to an earlier pipeline stage, wherein the first in-flight call branch instruction has not yet updated the first RAS.

18. The system as recited in claim 14, wherein the second RAS is updated in a later pipeline stage than the next fetch prediction unit predicts a next fetch address, wherein the second RAS is updated at an earlier pipeline stage than the first RAS, and wherein any call or return branch instructions in-flight toward the first RAS are pipelined back to the second RAS and utilized by the second RAS to generate the prediction for the new return branch instruction.

19. The system as recited in claim 14, wherein a top of the second RAS has a different return address from a top of the first RAS for multiple clock cycles.

20. The system as recited in claim 14, wherein the second RAS is configured to determine where to forward a return address from depending on how many return and call branches are in-flight and relative positions of the return and call branch instructions within pipeline stages of the processor.

* * * * *